US011604673B2

(12) United States Patent
Tsirkin

(10) Patent No.: US 11,604,673 B2
(45) Date of Patent: Mar. 14, 2023

(54) MEMORY ENCRYPTION FOR VIRTUAL MACHINES BY HYPERVISOR-CONTROLLED FIRMWARE

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 286 days.

(21) Appl. No.: 16/943,556

(22) Filed: Jul. 30, 2020

(65) Prior Publication Data

US 2022/0035648 A1 Feb. 3, 2022

(51) Int. Cl.
*G06F 9/455* (2018.01)
*G06F 12/1018* (2016.01)
*G06F 12/14* (2006.01)

(52) U.S. Cl.
CPC ...... *G06F 9/45558* (2013.01); *G06F 9/45545* (2013.01); *G06F 12/1018* (2013.01); *G06F 12/1408* (2013.01); *G06F 2009/45583* (2013.01); *G06F 2009/45587* (2013.01); *G06F 2212/151* (2013.01)

(58) Field of Classification Search
CPC ............. G06F 9/45558; G06F 9/45545; G06F 2009/45583; G06F 2212/151; G06F 2009/45587
See application file for complete search history.

(56) References Cited

U.S. PATENT DOCUMENTS

| 8,539,222 | B2 | 9/2013 | Ashok et al. |
| 9,021,476 | B1 | 4/2015 | Pratt |
| 9,300,640 | B2 | 3/2016 | Pate |
| 2016/0164880 | A1* | 6/2016 | Colesa ............... G06F 21/53 726/1 |
| 2017/0288874 | A1* | 10/2017 | Narendra Trivedi ........ G06F 9/45533 |
| 2019/0065756 | A1* | 2/2019 | Tsirkin ................ G06F 12/145 |

(Continued)

FOREIGN PATENT DOCUMENTS

EP 2907071 A1 8/2015

OTHER PUBLICATIONS

AMD SEV-SNP: Strengthening VM Isolation With Integrity Protection and More, Jan. 2020, 20 pages.

(Continued)

*Primary Examiner* — Dong U Kim
(74) *Attorney, Agent, or Firm* — Lowenstein Sandler LLP

(57) ABSTRACT

Systems and methods for encryption support for virtual machines. An example method may comprise initializing, by a firmware module associated with a virtual machine running on a host computer system, an exclusion range register associated with the virtual machine with a value specifying a first portion of guest memory, wherein the first portion of the guest memory comprises an exclusion range marked as reserved; encrypting, by the firmware using an ephemeral encryption key, a second portion of the guest memory; booting, by a hypervisor of the host computer system, the virtual machine; and responsive to intercepting, by the hypervisor, a privileged instruction executed by the virtual machine, performing at least one of: copying data for performing the privileged instruction to the first portion of the guest memory or copying data for performing the privileged instruction from the first portion of the guest memory.

20 Claims, 6 Drawing Sheets

(56) References Cited

U.S. PATENT DOCUMENTS

2020/0310972 A1\* 10/2020 Shanbhogue ....... G06F 12/1009
2021/0232693 A1\* 7/2021 Leenstra ................. G06F 12/10

OTHER PUBLICATIONS

Morbitzer, "Extracting Secrets from Encrypted Virtual Machines", Jan. 7, 2019, 10 pages https://arxiv.org/abs/1901.01759.
Stroud, "Shielded VMs", QuinStreet Inc., 2020, 6 pages https://www.webopedia.com/TERM/S/shielded-vm.html.
Lee, "VMware vSphere Virtual Machine Encryption Configuration", Vembu Technologies, Feb. 5, 2019, 15 pages https://www.vembu.com/blog/vmware-vsphere-virtual-machine-encryption-configuration/.

\* cited by examiner

MEMORY ENCRYPTION FOR VIRTUAL MACHINES BY HYPERVISOR-CONTROLLED FIRMWARE

TECHNICAL FIELD

The present disclosure is generally related to virtualized computer systems, and more particularly, to memory encryption for virtual machines by hypervisor-controlled firmware.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines (also referred to herein as "guests" running on a host computer system) in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
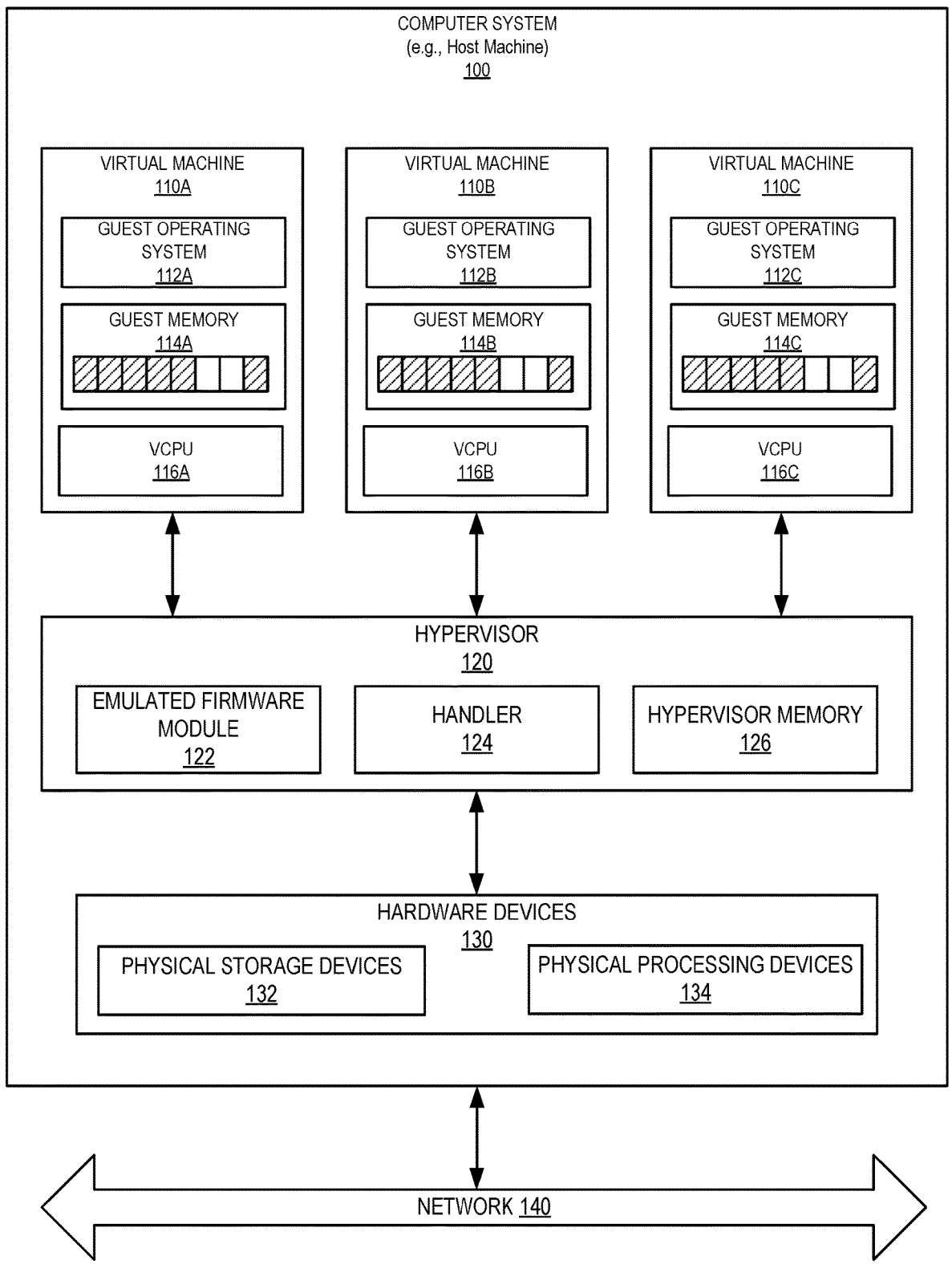
FIG. 1 depicts a high-level block diagram of an example host computer system that performs encryption support for virtual machines, in accordance with one or more aspects of the present disclosure.

Described herein are systems and methods for memory encryption for virtual machines by hypervisor-controlled firmware. Modern computer systems use trusted execution environments (TEEs) to enhance the isolation of data of a computing process from other processes executing on the computer system. A trusted execution environment may use hardware-based encryption to encrypt the data of a lower privileged process so that higher privileged computing processes would not have access to the data in an unencrypted form. This enables a lower privileged process to isolate its data from the higher privileged processes even though the higher privileged processes may be responsible for managing the data. In one example, one or more TEEs may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, other technology, or a combination thereof.

Encrypted virtual machine memory is a technology supported by TEEs, in which the guest memory of the virtual machine is protected from the hypervisor by means of encryption. In some implementations, the virtual machine can control which memory is encrypted by means of marking memory pages as unencrypted or encrypted in guest controlled guest page tables, which can be used by a virtual central processing unit (vCPU) for translation of guest virtual addresses to guest physical addresses. The guest physical addresses may then be translated by the host to host physical addresses. An encryption key for each memory page of the encrypted memory may be performed using, for example, a random number and the location of the memory page (e.g., a host physical address).

However, this type of guest-driven encryption requires modifying the virtual machine, which may result in degraded performance. An alternative includes hypervisor-driven encryption, where the hypervisor can control which memory pages are encrypted by means of marking the memory pages as unencrypted or encrypted in host controlled host page tables. Although this allows for guest to remain unmodified, issues emerge when the hypervisor is malicious or vulnerable. As such, it is desirable to run encrypted unmodified guests having protection from malicious and vulnerable hypervisors.

Aspects of the present disclosure address the above and other deficiencies by implementing encrypted virtual machine support for unmodified guests. To allow running unmodified guests while still protecting guests from a malicious or a compromised hypervisor, the encryption can be handed by the guest using hypervisor-supplied firmware. In particular, the hypervisor may generate an emulated firmware module, which, when invoked by a virtual machine during its boot sequence, would store, in a dedicated exclusion range register, one or more exclusion address ranges that specify respective guest memory buffers to be left unencrypted for supporting guest-hypervisor communications. The firmware would then mark the guest memory buffers specified by the exclusion ranges as reserved, thus preventing the virtual machine from overwriting the contents of those memory buffers upon boot. The firmware would encrypt the remaining guest memory using an ephemeral (i.e., CPU-provided) encryption key, and would allow the virtual machine to continue with the boot process. After the virtual machine has completed the boot, the hypervisor may utilize the unencrypted memory buffers for communicating with the virtual machine. In an illustrative example, the hypervisor may intercept a privileged instruction which the virtual machine attempts to execute. Upon intercepting the privileged instruction, the hypervisor may transfer the execution control to a handler that copies to and/or from an unencrypted memory buffer the data necessary to perform the privileged instruction. Examples of privileged instructions include loading or storing control registers, loading or storing model-specific registers, loading an interrupt descriptor table, or invalidate a page entry in the translation look-aside buffer. The address and contents of the exclusion range register, the address of the handler, and the address and contents of one or more control environments (e.g., page tables) can be reflected by a measurement (e.g., a cryptographic hash function) that is sent by the hypervisor to the owner of the virtual machine before boot, thus allowing verification of the integrity of the virtual execution environment.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-C, hypervisor 120, hardware devices 130, and a network 140.

Virtual machines 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110A-C may execute guest operating systems 112A-C that manage guest memory 114A-C and virtual central processing units (vCPU) 116A-C respectively.

Guest memory 114A-C may be any virtual memory, logical memory, physical memory, other portion of memory, or a combination thereof for storing, organizing, or accessing data. Guest memory 114A-C may represent the portion of memory that is designated by hypervisors 120 for use by one or more respective virtual machines 110A-C. Guest memory 114A-C may be managed by guest operating system 112A-C and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

Hypervisor memory 126 (e.g., host memory) may be the same or similar to the guest memory but may be managed by hypervisor 120 instead of a guest operating system. Hypervisor memory 126 may be segmented into host pages, which may be in different states. The states may correspond to unallocated memory, memory allocated to guests, and memory allocated to hypervisor(s). The unallocated memory may be host memory pages and guest memory pages that have not yet been allocated by hypervisor memory 126 or were previously allocated by hypervisor 120 and have since been deallocated (e.g., freed) by hypervisor 120. The memory allocated to guests may be a portion of hypervisor memory 126 that has been allocated by hypervisor 120 to virtual machines 110A-C and corresponds to guest memory of virtual machine 114A-C. Other portions of hypervisor memory may be allocated for use by hypervisor 120, a host operating system, hardware device, other module, or a combination thereof.

Hypervisor 120 may also be known as a virtual machine monitor (VMM) and may provide virtual machines 110A-C with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130, and may manage execution of virtual machines 110A-C on a host machine. This includes provisioning resources of a physical central processing unit ("CPU") to each virtual machine 110A-C running on the host machine. Provisioning the physical CPU resources may include associating one or more vCPUs 116A-C with each virtual machine 110A-C. VCPU 116A-C may be provisioned by a core of the physical host CPU or a number of time slots reserved from one or more cores of the physical host CPU. VCPU 116A-C may be implemented by an execution thread that is scheduled to run on a physical host CPU. Software executing in virtual machines 110A-C may operate with reduced privileges such that hypervisor 120 retains control over resources. Hypervisor 120 retains selective control of the processor resources, physical memory, interrupt management, and input/output ("I/O"). In the example shown, hypervisor 120 may include a guest initialization component 122 and firmware handler 124. Emulated firmware module 122 and handler 124 may enable vCPUs 116A-C to create, by a guest, an encrypted virtual machine. Emulated firmware module 122 and handler 124 may each be separated into one or more components or may be included within the same component, and are discussed in more detail below in regards to FIG. 2.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
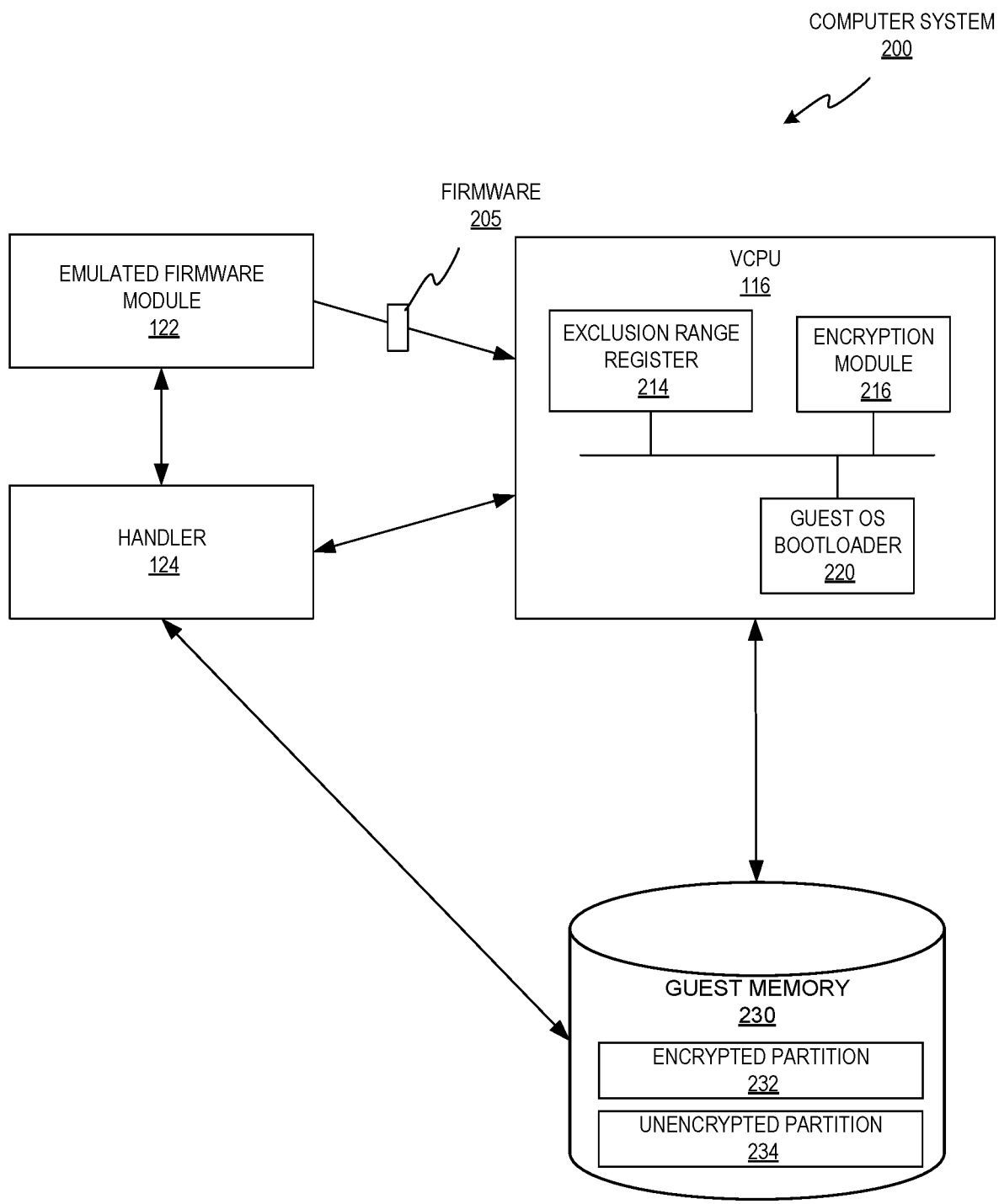
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include vCPU 116 (e.g., vCPU 116A-C), emulated firmware module 122, handler 124, guest memory 230. VCPU 116 may include exclusion range register 214, encryption module 216, and guest OS bootloader 220.

VCPU 116 may initiate a boot sequence for a virtual machine (e.g., virtual machine 110A-C) and invoke emulated firmware module 122. The emulated firmware module 122 may be generated by the hypervisor. Emulated firmware module 122 may send firmware 205 to vCPU 116 for execution. Specifically, emulated firmware module 122 may first initialize exclusion range register 214. Emulated firmware module 122 may store in exclusion range register 214 one or more exclusion address ranges that specify respective guest memory buffers to be left unencrypted (e.g., unencrypted partition 234) for supporting guest-hypervisor communications. Firmware 205 may then mark unencrypted partition 234 as reserved (e.g., read-only), to prevent the virtual machine from overwriting the contents of unencrypted partition 234 upon boot. Exclusion range register 214 may be a memory type range register (MTRR), an address-range register (ARR), or any other type of control register added to a CPU or vCPU that may be used as a control mechanism to provide system software with control of how accesses to memory ranges by vCPU 116 are cached. Exclusion range register 214 may use a set of programmable model-specific registers (MSRs).

Encryption module 216, via firmware 205, may encrypt a portion of the guest memory 230 (e.g., encrypted partition 232) using a cryptographic key. In particular, encryption module 216 may encrypt the remaining portion of guest memory 230. In an example, encryption module 216 may encrypt the guest memory pages in encrypted partition 232 using Secure Memory Encryption (SME). Specifically, marked guest memory pages may be decrypted and encrypted during a read process or a write process. The guest memory pages may be encrypted using a cryptographic key (e.g., a single 128-bit ephemeral AES key) which may be created randomly using a hardware random generator at each boot of the computer system. In another example, all of the guest memory pages in encrypted partition 232 may be encrypted using Transparent SME (TSME). In yet another example, the guest memory pages in the encrypted partition 232 may be encrypted and decrypted using Secure Encrypted Virtualization (SEV). The cryptographic key may be sent to a guest owner of the virtual machine (e.g., a server of an owner of the encrypted virtual machine).

Responsive to completion of the boot sequence, the hypervisor may utilize the unencrypted memory buffers (e.g., unencrypted partition 234) for communicating with the virtual machine. In an illustrative example, the hypervisor may intercept a privileged instruction which the virtual machine attempts to execute. Upon intercepting the privileged instruction, the hypervisor may transfer execution control to handler 124. Handler 124 may copy to and/or from an unencrypted memory buffer of unencrypted partition 234 the data necessary to perform the privileged instruction. Examples of privileged instructions include loading or storing control registers, loading or storing model-specific registers, loading an interrupt descriptor table, or invalidate a page entry in the translation look-aside buffer.

Prior to completion of the boot sequence, one or more of the address and contents of exclusion range register 214, the address of handler 124, and the address and contents of one or more control environments (e.g., page tables) can be reflected by a measurement (e.g., a cryptographic hash function) and sent by the hypervisor to the guest owner. This allows for verification of the integrity of the virtual execution environment. If the measurement is regarded as being correct, the guest owner can provide the cryptographic key to be used to start the encrypted virtual machine. The measurement may include any other code, data structures, a configuration, and/or information that can be loaded into guest memory and used to detect if any code configuration or data has been altered or corrupted.

In an example, the hypervisor may implement an attestation process to prove to the guest owner that the (encrypted) virtual machine may be securely launched with encrypted virtualization features enabled. During the attestation process, the guest owner may provide a guest image to the hypervisor. The hypervisor can generate a measurement using the guest image. As discussed above, the measurement may represent contents of guest memory 230 (e.g., the address and contents of exclusion range register 214, the address of handler 124, the address and contents of one or more control environments, etc. The hypervisor may pass the measurement to the guest owner. Upon receiving the measurement, the guest owner may determine whether the measurement is correct. If the measurement is regarded as being correct, the guest owner can provide the cryptographic key to be used to start the encrypted virtual machine and access the encrypted partition 232.

In an example, responsive to the measurement being regards as correct, the hypervisor may receive the cryptographic key from the guest owner, and firmware 205 may supply it to guest OS bootloader 220 through encrypted partition 232. Guest OS bootloader 220 may then boot the guest operating system and use the cryptographic key to access the encrypted partition 232.

Figure 3:
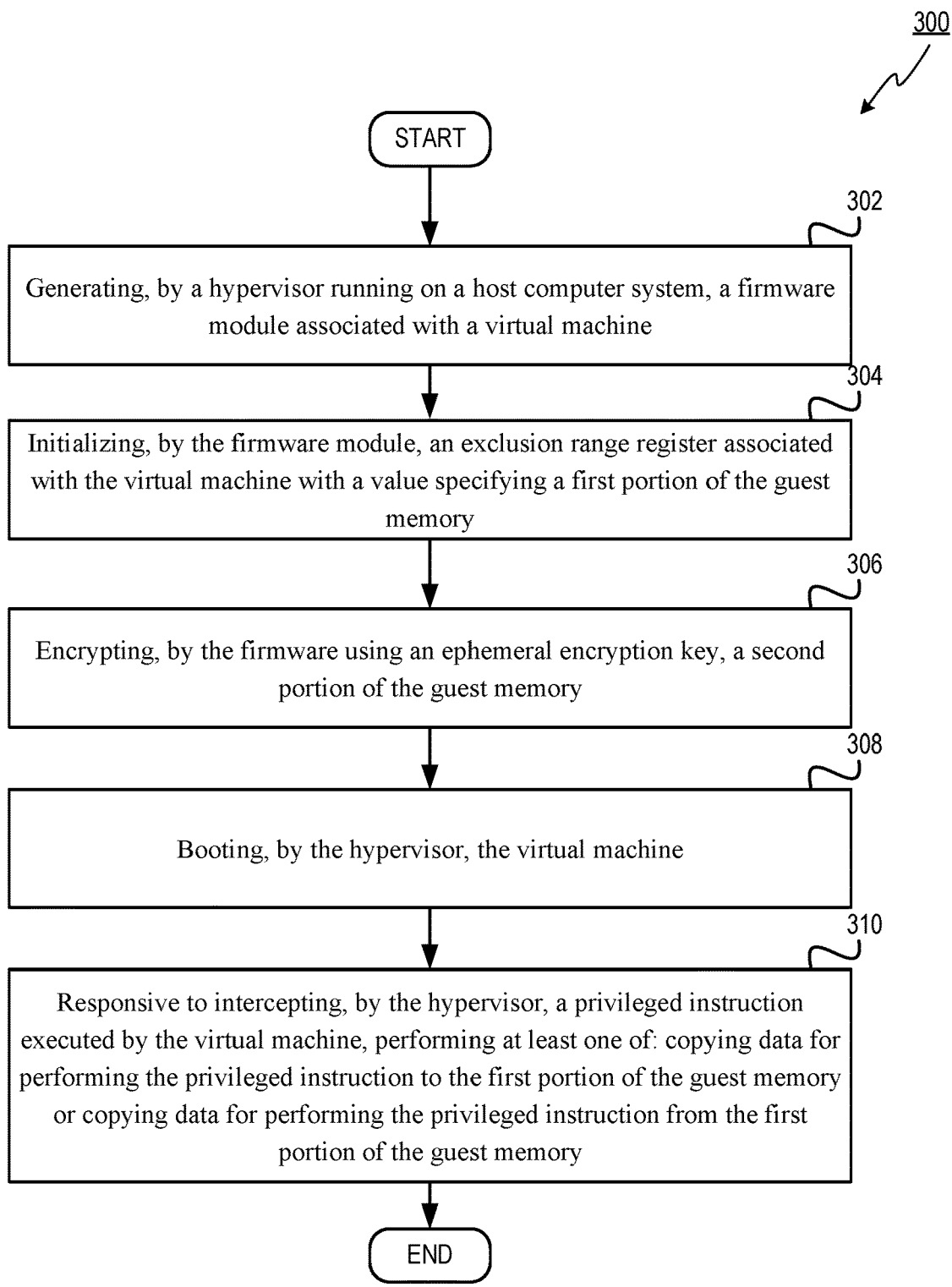
FIG. 3 depicts a flow diagram of an example method for creating a guest encrypted virtual machine by hypervisor-controlled firmware, in accordance with one or more aspects of the present disclosure.

FIG. 3 depicts a flow diagram of an illustrative example of a method 300 for creating a guest encrypted virtual machine by hypervisor-controlled firmware, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, a hypervisor running on a host computer system may generate a firmware module associated with a virtual machine.

At block 304, the firmware module may initialize an exclusion range register associated with the virtual machine with a value specifying a first portion of the guest memory. In an embodiment, firmware from the firmware module may allocate an exclusion range of the guest memory and mark it as reserved (e.g., read-only).

At block 306, the firmware may encrypt, using a cryptographic key, a second portion of the guest memory. The second portion of the guest memory may include all guest memory except for the first portion. In an example, the guest memory pages in the second portion of guest memory may be encrypted using SME. The cryptographic key may be a single 128-bit ephemeral AES key, which may be created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner.

At block 308, the hypervisor may boot the virtual machine. At block 310, responsive to intercepting, by the hypervisor, a privileged instruction executed by the virtual machine, the hypervisor may perform at least one of: copying data for performing the privileged instruction to the first portion of the guest memory or copying data for performing the privileged instruction from the first portion of the guest memory.

In an embodiment, the hypervisor may send a measurement reflecting a handler address, a control environment, and/or the exclusion range register to a guest owner. The measurement may be a cryptographic hash of one or more of the handler address, contents of the control environment, an address of the exclusion range register, and contents of the exclusion range register. The control environment may include a page table.

In another embodiment, the hypervisor may receive the cryptographic key from a guest owner. The hypervisor may then supply, by the firmware, the cryptographic key to the virtual machine through the second portion of guest memory, and boot a guest operating system. Responsive to completing the operations described herein above with references to block 310, the method may terminate.

Figure 4:
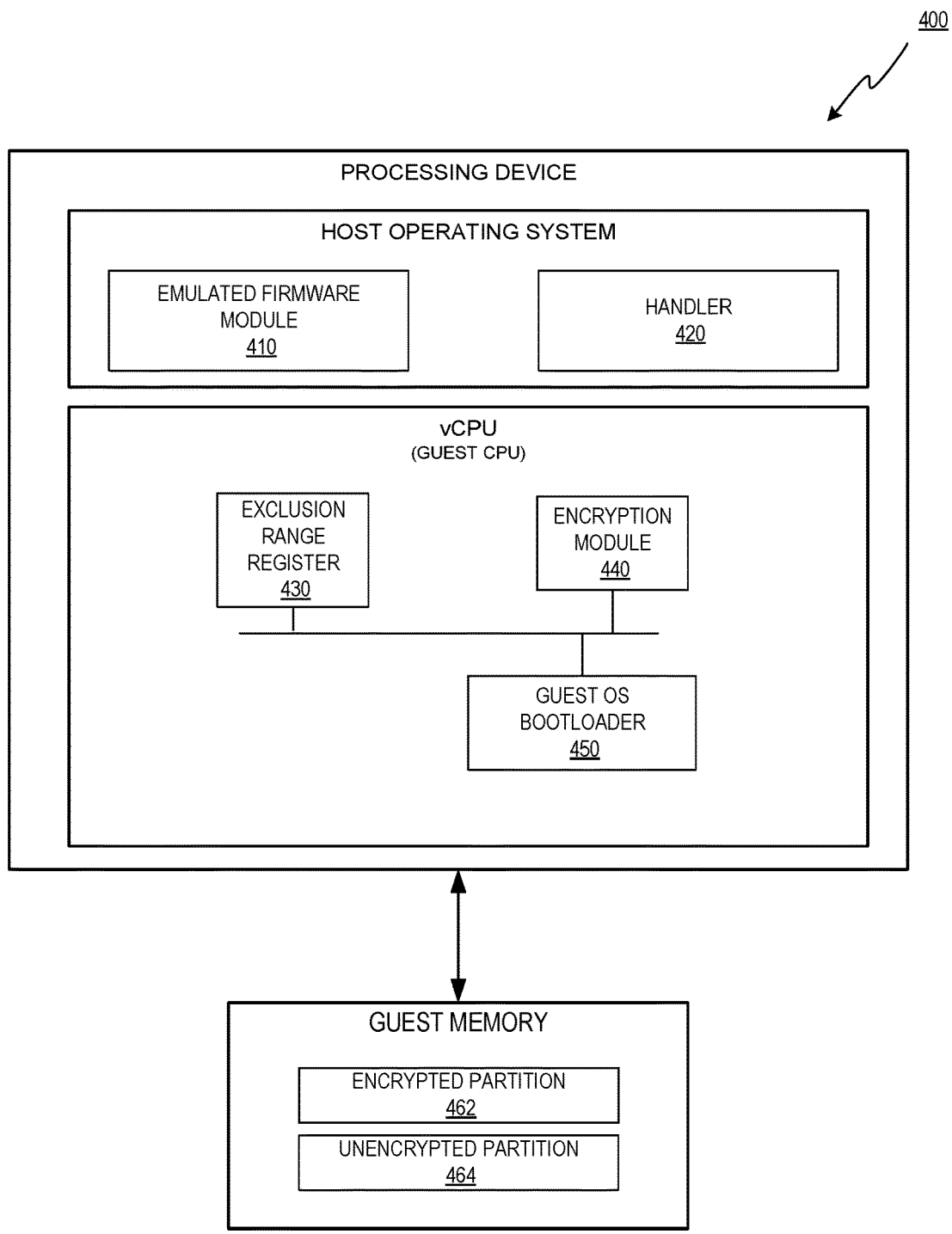
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing device 100 and may include one or more processing devices and one or more memory devices. In the example shown, computer system 500 may include emulated firmware module 410, handler 420, exclusion range register 430, encryption module 440, guest OS bootloader 450, encrypted partition 462, and unencrypted partition 464.

A hypervisor running on a host computer system may generate emulate firmware module 410 associated with a virtual machine. Emulated firmware module 410 may initialize exclusion range register 430 associated with the virtual machine with a value specifying a first portion of the guest memory. In an embodiment, Emulated firmware module 410, via firmware, may allocate an exclusion range of the guest memory and mark it as reserved (e.g., read-only).

Encryption module 440, via the firmware, may encrypt a second portion of the guest memory using a cryptographic key. The second portion of the guest memory may include all guest memory except for the first portion. In an example, the guest memory pages in the second portion of guest memory may be encrypted using SME. The cryptographic key may be a single 128-bit ephemeral AES key, which may be created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner.

The hypervisor may boot the virtual machine. Responsive to intercepting, by the hypervisor, a privileged instruction executed by the virtual machine, the hypervisor may transfer execution control to handler 420 to perform at least one of: copying data for performing the privileged instruction to the first portion of the guest memory or copying data for performing the privileged instruction from the first portion of the guest memory.

In an embodiment, the hypervisor may send a measurement reflecting an address of handler 420, a control environment, and/or the exclusion range register to a guest owner. The measurement may be a cryptographic hash of one or more of the handler address, contents of the control environment, an address of the exclusion range register, and contents of the exclusion range register. The control environment may include a page table.

In another embodiment, the hypervisor may receive the cryptographic key from a guest owner. The hypervisor may then supply, by the firmware, the cryptographic key to the guest OS bootloader 450 through the second portion of guest memory, and boot a guest operating system.

Figure 5:
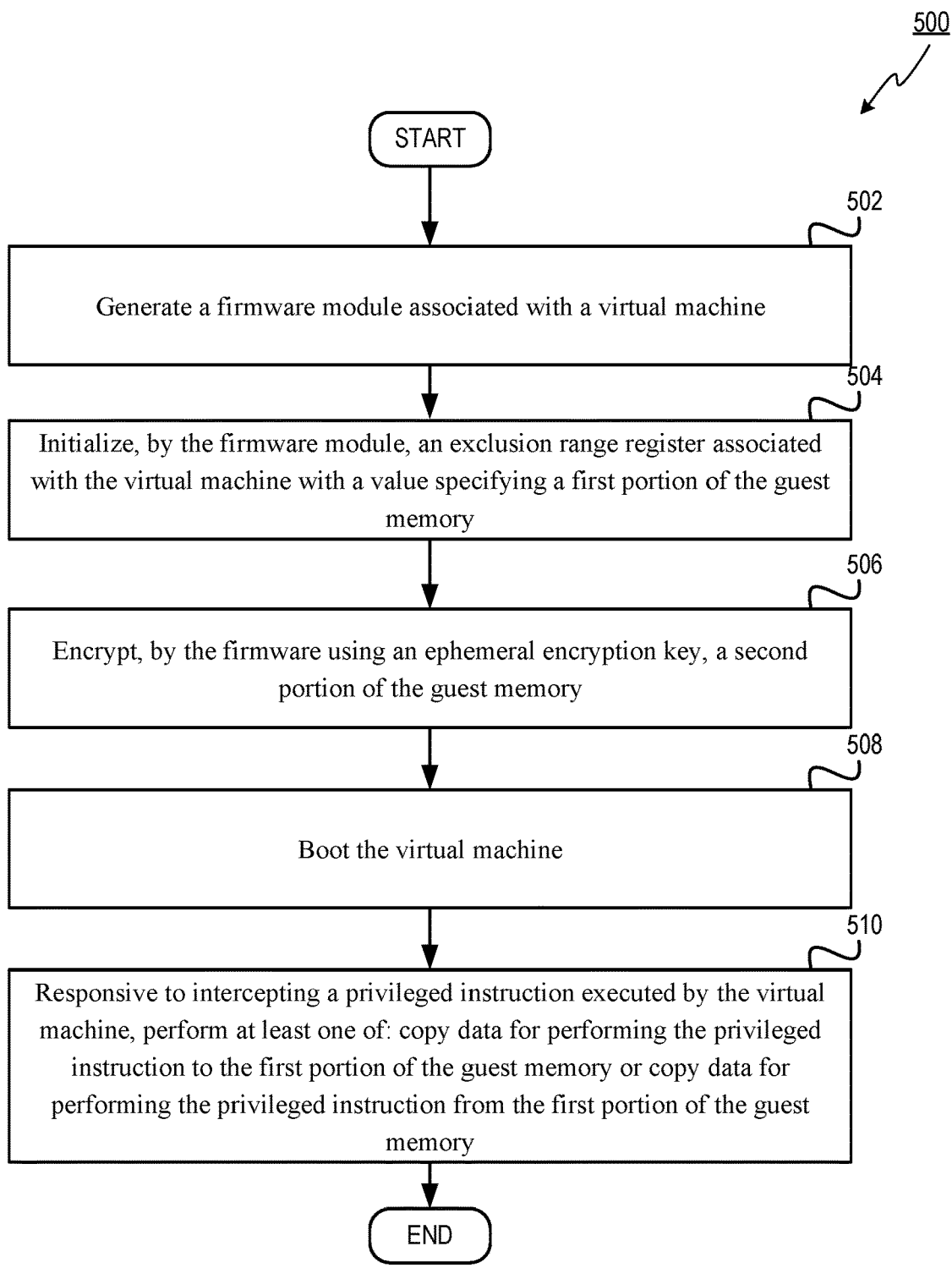
FIG. 5 depicts a flow diagram of another example method for creating a guest encrypted virtual machine by hypervisor-controlled firmware, in accordance with one or more aspects of the present disclosure.

FIG. 5 depicts a flow diagram of one illustrative example of a method 500 for creating a guest encrypted virtual machine by hypervisor-controlled firmware, in accordance with one or more aspects of the present disclosure. Method 500 may be similar to method 500 and may be performed in the same or a similar manner as described above in regards to method 500. Method 500 may be performed by processing devices of a server device or a client device and may begin at block 502.

In block 502, a processing device may generate a firmware module associated with a virtual machine. At block 504, the processing device, via the firmware module, may initialize an exclusion range register associated with the virtual machine with a value specifying a first portion of the guest memory. In an embodiment, the firmware may allocate an exclusion range of the guest memory and mark it as reserved (e.g., read-only).

At block 506, the processing device, via the firmware, may encrypt, using a cryptographic key, a second portion of the guest memory. The second portion of the guest memory may include all guest memory except for the first portion. In an example, the guest memory pages in the second portion of guest memory may be encrypted using SME. The cryptographic key may be a single 128-bit ephemeral AES key, which may be created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner.

At block 508, the processing device may boot the virtual machine. At block 510, responsive to intercepting, by the processing device, a privileged instruction executed by the virtual machine, the processing device may perform at least one of: copy data for performing the privileged instruction to the first portion of the guest memory or copy data for performing the privileged instruction from the first portion of the guest memory.

In an embodiment, the processing device may send a measurement reflecting a handler address, a control environment, and/or the exclusion range register to a guest owner. The measurement may be a cryptographic hash of one or more of the handler address, contents of the control environment, an address of the exclusion range register, and contents of the exclusion range register. The control environment may include a page table.

Figure 6:
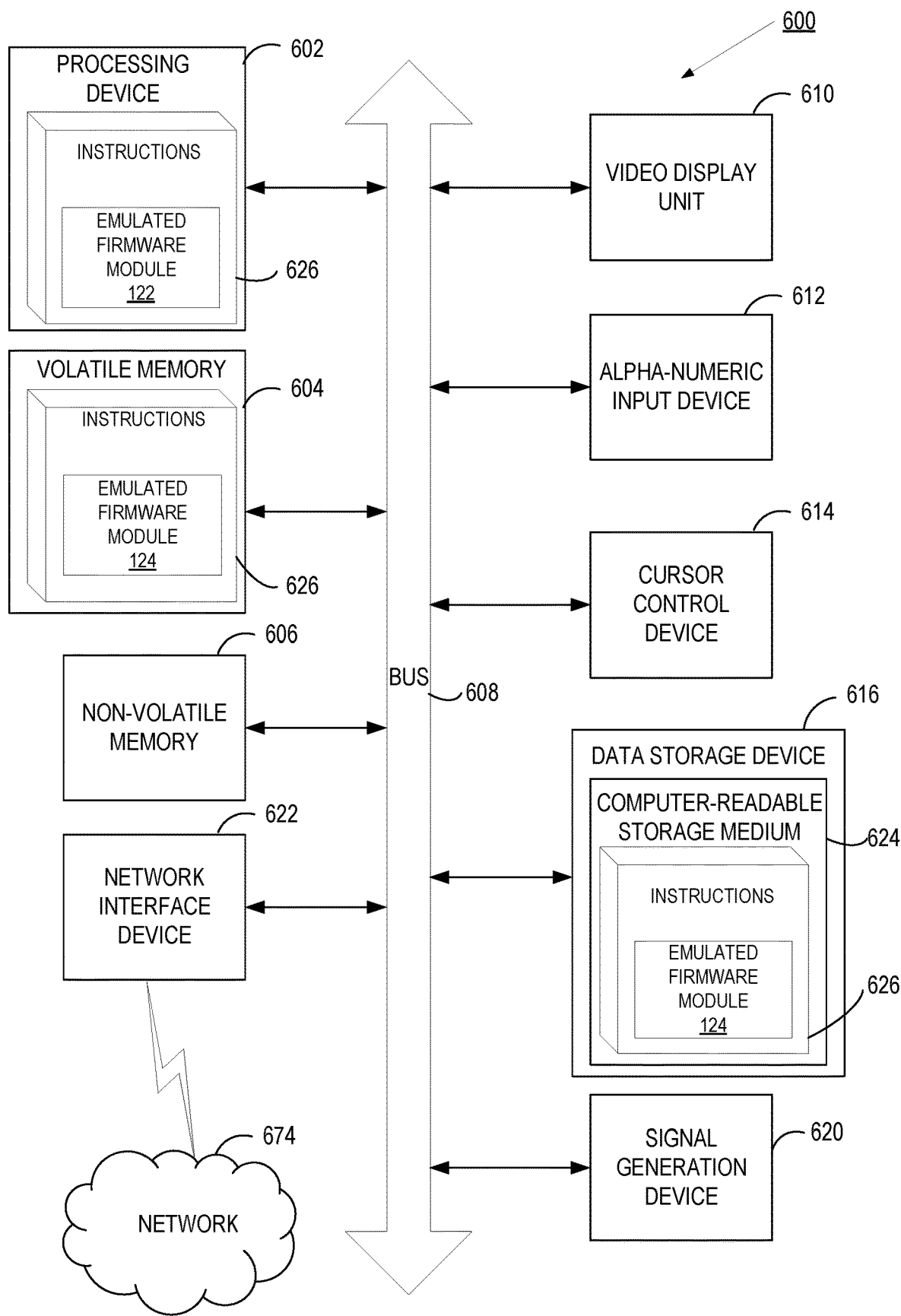
FIG. 6 depicts a block diagram of an illustrative computing device operating in accordance with the examples of the present disclosure.

In another embodiment, the processing device may receive the cryptographic key from a guest owner. The processing device may then supply, by the firmware, the cryptographic key to the virtual machine through the second portion of guest memory, and boot a guest operating system. Responsive to completing the operations described herein above with references to block 510, the method may terminate FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for emulated firmware module 122, handler 124 (not shown), and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   initiating, by a virtual central processing unit (vCPU) running on a host computer system, a boot sequence for a virtual machine associated with the vCPU;
   in response to the initiating, generating, during the boot sequence and by a hypervisor of the host computer system, a firmware module associated with the virtual machine;
   initializing, during the boot sequence and by the firmware module, an exclusion range register associated with the virtual machine with a value specifying a first portion of guest memory, wherein the first portion of the guest memory comprises an exclusion range marked as reserved;
   encrypting, during the boot sequence and by the firmware module using an ephemeral encryption key, a second portion of the guest memory;
   booting, by the hypervisor, the virtual machine; and
   responsive to intercepting, by the hypervisor, a privileged instruction executed by the virtual machine, performing at least one of: copying data for performing the privileged instruction from the hypervisor to the first portion of the guest memory or copying data for performing the privileged instruction from the first portion of the guest memory to the hypervisor.

2. The method of claim 1, further comprising:
   sending a measurement reflecting a handler address, a control environment, and the exclusion range register to a guest owner.

3. The method of claim 2, wherein the control environment comprises a page table.

4. The method of claim 2, wherein the measurement comprises a cryptographic hash of the handler address, contents of the control environment, an address of the exclusion range register, and contents of the exclusion range register.

5. The method of claim 1, further comprising:
   generating, by the hypervisor, the firmware module associated with the virtual machine.

6. The method of claim 1, wherein the second portion comprises all guest memory except for the first portion.

7. The method of claim 1, further comprising:
receiving the ephemeral encryption key from a guest owner;
supplying, by the firmware module, the ephemeral encryption key to the virtual machine through the second portion of guest memory; and
booting a guest operating system.

8. A system, comprising:
a memory;
a processing device operatively coupled to the memory, the processing device configured to:
initiate, by a virtual central processing unit (vCPU) running on a host computer system, a boot sequence for a virtual machine associated with the vCPU;
in response to the initiating, generate, during the boot sequence and by a hypervisor of the host computer system, a firmware module associated with the virtual machine;
initialize, during the boot sequence and by the firmware module, an exclusion range register associated with the virtual machine with a value specifying a first portion of guest memory, wherein the first portion of the guest memory comprises an exclusion range marked as reserved;
encrypt, during the boot sequence and by the firmware module using an ephemeral encryption key, a second portion of the guest memory;
boot, by the hypervisor of the host computer system, the virtual machine; and
responsive to intercepting, by the hypervisor, a privileged instruction executed by the virtual machine, perform at least one of: copying data for performing the privileged instruction from the hypervisor to the first portion of the guest memory or copying data for performing the privileged instruction from the first portion of the guest memory to the hypervisor.

9. The system of claim 8, further comprising the processing device configured to:
send a measurement reflecting a handler address, a control environment, and the exclusion range register to a guest owner.

10. The system of claim 9, wherein the control environment comprises a page table.

11. The system of claim 9, wherein the measurement comprises a cryptographic hash of the handler address, contents of the control environment, an address of the exclusion range register, and contents of the exclusion range register.

12. The system of claim 8, further comprising the processing device configured to:
generate, by the hypervisor, the firmware module associated with the virtual machine.

13. The system of claim 8, wherein the second portion comprises all guest memory except for the first portion.

14. The system of claim 8, further comprising the processing device configured to:
receive the ephemeral encryption key from a guest owner;
supply, by the firmware module, the ephemeral encryption key to the virtual machine through the second portion of guest memory; and
boot a guest operating system.

15. A non-transitory machine-readable storage medium storing instructions that cause a processing device to:
initiate, by a virtual central processing unit (vCPU) running on a host computer system, a boot sequence for a virtual machine associated with the vCPU;
in response to the initiating, generate, during the boot sequence and by a hypervisor of the host computer system, a firmware module associated with the virtual machine;
initialize, during the boot sequence and by the firmware module, an exclusion range register associated with the virtual machine with a value specifying a first portion of guest memory, wherein the first portion of the guest memory comprises an exclusion range marked as reserved;
encrypt, during the boot sequence and by the firmware module using an ephemeral encryption key, a second portion of the guest memory;
boot the virtual machine; and
responsive to intercepting a privileged instruction executed by the virtual machine, perform at least one of: copying data for performing the privileged instruction from the hypervisor to the first portion of the guest memory or copying data for performing the privileged instruction from the first portion of the guest memory to the hypervisor.

16. The non-transitory machine-readable storage medium of claim 15, further comprising the processing device configured to:
send a measurement reflecting a handler address, a control environment, and the exclusion range register to a guest owner.

17. The non-transitory machine-readable storage medium of claim 16, wherein the measurement comprises a cryptographic hash of the handler address, contents of the control environment, an address of the exclusion range register, and contents of the exclusion range register.

18. The non-transitory machine-readable storage medium of claim 15, further comprising the processing device configured to:
generate the firmware module associated with the virtual machine.

19. The non-transitory machine-readable storage medium of claim 15, wherein the second portion comprises all guest memory except for the first portion.

20. The non-transitory machine-readable storage medium of claim 15, further comprising the processing device configured to:
receive the ephemeral encryption key from a guest owner;
supply, by the firmware module, the ephemeral encryption key to the virtual machine through the second portion of guest memory; and
boot a guest operating system.

* * * * *